United States Patent
Venkateswara

(10) Patent No.: US 11,526,215 B2
(45) Date of Patent: Dec. 13, 2022

(54) REDUCING KEYSTROKES REQUIRED FOR INPUTTING CHARACTERS OF INDIC LANGUAGES

(71) Applicant: Rao L Venkateswara, Andhra Pradesh (IN)

(72) Inventor: Rao L Venkateswara, Andhra Pradesh (IN)

( * ) Notice: Subject to any disclaimer, the term of this patent is extended or adjusted under 35 U.S.C. 154(b) by 20 days.

(21) Appl. No.: 16/973,757

(22) PCT Filed: Jun. 10, 2019

(86) PCT No.: PCT/IN2019/050446
§ 371 (c)(1),
(2) Date: Aug. 9, 2021

(87) PCT Pub. No.: WO2019/234768
PCT Pub. Date: Dec. 12, 2019

(65) Prior Publication Data
US 2022/0066571 A1   Mar. 3, 2022

(51) Int. Cl.
*G06F 3/023* (2006.01)
*G06F 3/02* (2006.01)

(52) U.S. Cl.
CPC .......... *G06F 3/0233* (2013.01); *G06F 3/0219* (2013.01)

(58) Field of Classification Search
CPC .......... G06F 3/01; G06F 3/018; G06F 3/0219; G06F 3/0233; G06F 3/4886
See application file for complete search history.

(56) References Cited

U.S. PATENT DOCUMENTS

| | | | |
|---|---|---|---|
| 2005/0024338 A1* | 2/2005 | Ye | G06F 3/0219 345/168 |
| 2017/0329460 A1* | 11/2017 | Bae | G06F 3/04842 |

* cited by examiner

*Primary Examiner* — Priyank J Shah
(74) *Attorney, Agent, or Firm* — Emerson, Thomson & Bennett, LLC; Roger D. Emerson; Warren A. Rosborough

(57) ABSTRACT

An aspect of the present disclosure provides for determining characters inputted. In an embodiment, a key activated among one or more keys of a keyboard and a sensor activated among one or more sensors associated with one or more fingers are identified. An element or a special function corresponding to the key activated and an element or a special function corresponding to the sensor activated are determined. A character is determined based on the element or the special function corresponding to the key activated and the element or the special function corresponding to the sensor activated. A first set of elements of an Indic language and a first set of special functions are assigned to the one or more keys of the keyboard, and a second set of elements of the Indic language and a second set of special functions are assigned to the one or more sensors.

35 Claims, 8 Drawing Sheets

REDUCING KEYSTROKES REQUIRED FOR INPUTTING CHARACTERS OF INDIC LANGUAGES

PRIORITY CLAIM

The instant patent application is related to and claims priority from the India Provisional Patent Application entitled "REDUCING KEYSTROKES REQUIRED FOR TYPING CHARACTERS OF INDIC LANGUAGES", naming the same Applicant as in the instant patent application, Application No. 201841021660, filed 9 Jun. 2018.

BACKGROUND OF THE DISCLOSURE

Technical Field

The present invention relates generally to methods and systems for data entry, specifically to methods and systems for inputting characters of Indic languages. More specifically, the present invention relates to methods and systems for reducing keystrokes required for inputting characters of Indic languages.

Related Art

Inputting (or entering or typing) refers to the action of providing an input to a computing device. Computing devices include desktop computers, laptops, tablets, mobile phones, electronic typewriter, personal digital assistant (PDA) etc.

Indic languages refer to the languages whose scripts are derived from Brahmi script and/or Dravidian scripts. Indic languages include Telugu, Tamil, Hindi, Malayalam, Kannada, Konkani, Marathi, Gujarati, Punjabi, Sindhi, Rajasthani, Kashmiri, Nepali, Maithili, Manipuri, Dogre, Assami, Bengali, Bihari, Oriya, Sanskrit, and Sinhala.

The number of characters/letters in each of the Indic languages is generally higher than that of in English. Indic languages (scripts) include elements such as consonants, vowels, dependent vowel (vowel signs or vowel modifiers), conjunct consonant signs, symbols and numbers among others. One particular feature of Indic languages is that two elements may be combined to form a character. In some cases, characters are the elements themselves whereas in some other cases characters are a combination of two or more elements (for example, a combination of a consonant and a dependent vowel results in a new character).

A keystroke refers to a single press/touch of a key on a keyboard. A keyboard can be a physical keyboard or a virtual keyboard.

Existing keyboards for Indic languages more often require more than one keystroke for inputting a character. For instance, inputting a character that is formed by the combination of a consonant and a dependent vowel (combined character generally known as 'Mathra—barakhadi' in Hindi and 'gunintham' in Telugu) often requires more than one keystroke. For example, to input a character 'కి' ('ki') in Telugu, which is a combination of the consonant 'క' ('ka') and the dependent vowel (vowel sign) 'ి' ('E'), an existing keyboard requires a user to first press 'క' and then press 'shift+ vowel 'ఇ'" (consonant 'ka'+shift+vowel 'E'), thereby requiring three keystrokes. Keystrokes required may increase in the case of characters having conjunct consonant signs ('otthu' in Telugu, 'Dvithva Vyanjan' and 'Samyukht Vyanjan' in Hindi), Furthermore, the keystrokes required may vary in different keyboards.

Therefore, the inventor has recognized a need for the reduction of keystrokes required for inputting characters of Indic languages.

Aspects of the present disclosure are directed to reducing keystrokes required for inputting characters of Indic languages (Indic characters).

BRIEF DESCRIPTION OF THE DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

An aspect of the present disclosure provides for determining characters inputted. In an embodiment, a key activated among one or more keys of a keyboard and a sensor activated among one or more sensors associated with one or more fingers of a user are identified. An element or a special function corresponding to the key activated and an element or a special function corresponding to the sensor activated are determined. A character is determined based on the element or the special function corresponding to the key activated and the element or the special function corresponding to the sensor activated.

According to another aspect, the key activated is identified based on a key activation signal received at the processing system. The key gets activated upon receiving a keystroke from the user and sends the key activation signal to the processing system upon activation. The sensor activated is identified based on a sensor activation signal received at the processing system. The sensor gets activated when a keystroke is provided with a finger with which the sensor is associated and the sensor sends the sensor activation signal to the processing system upon activation.

According to yet another aspect, a first set of elements of an Indic language and a first set of special functions are assigned to the one or more keys of the keyboard, and a second set of elements of the Indic language and a second set of special functions are assigned to the one or more sensors.

In an embodiment, the first set of elements includes one or more consonants of the Indic language and the second set of elements includes one or more dependent vowels or one or more symbols of the Indic language.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
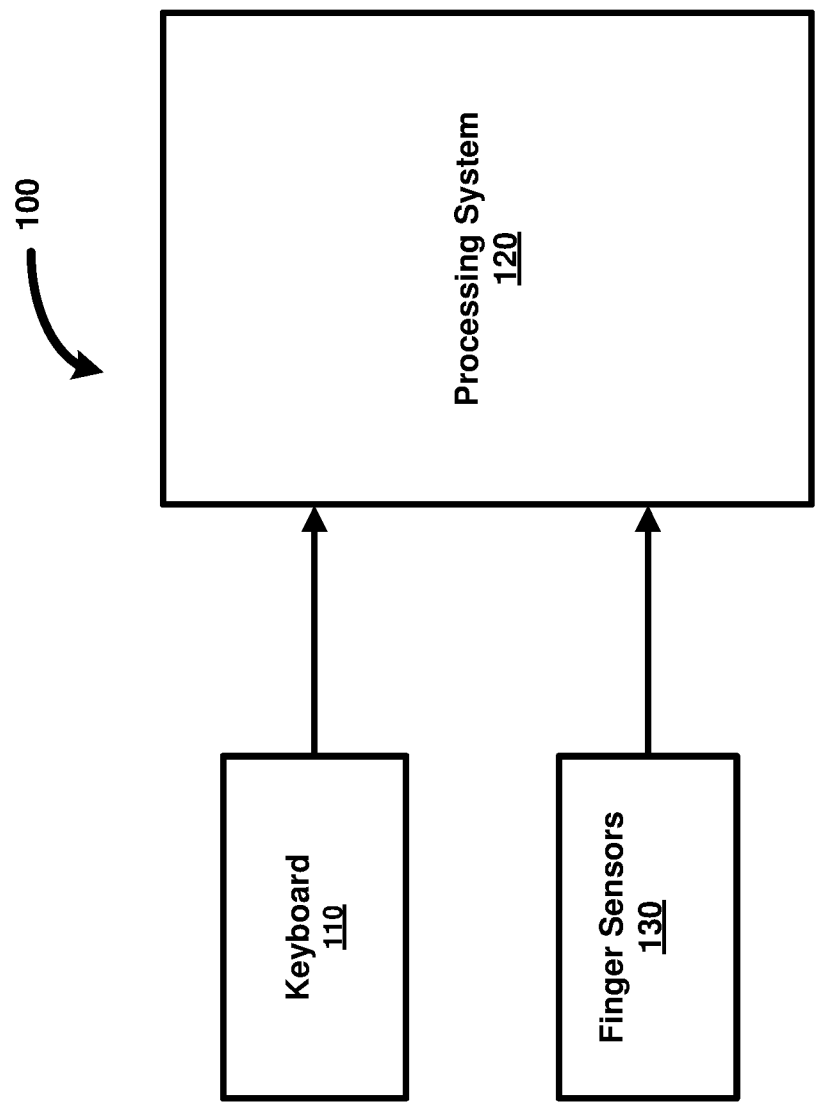
FIG. 1 is a block diagram illustrating an aspect of the present disclosure.

FIG. 1 is a block diagram illustrating the aspects of the present invention. FIG. 1 is shown containing keyboard 110, processing system 120 and finger sensors 130. The block diagram is shown with a representative set of components merely for illustration, though typical environments employing aspects of the present disclosure can have many more types and number of systems.

Keyboard 110 contains a set of keys representing elements of an Indic language (Indic script). Keyboard 110 may also contain keys assigned with special functions (special keys). Special keys are meant for special purposes and do not represent any elements themselves. When a user presses/touches a key (usually with fingers) on keyboard 110, the user is deemed to have made/provided a keystroke. The user can input a character by making/providing keystrokes on one or more keys on keyboard 110. When a user provides a keystroke by pressing a key on keyboard 110, the key gets activated and sends a key activation signal (corresponding to the key pressed) to processing system 120 indicating that the key is activated.

Finger sensors 130 represent one or more sensors associated with one or more fingers of the user providing keystrokes. In an example embodiment, finger sensors 130 contain ten sensors that are associated with the ten fingers (one sensor for each finger) of the hands of the user providing keystrokes. A finger sensor associated with a finger gets activated when the user presses/touches a key on keyboard 110 (i.e., when the user provides a keystroke) using the finger. For example, when the user provides a keystroke using his/her right hand middle finger, the finger sensor associated with the right hand middle finger gets activated and the finger sensor sends a sensor activation signal to processing system 120 indicating that the right hand middle finger sensor is activated. Finger sensors 130 can be any sensors known in the relevant arts and as will be apparent to a skilled practitioner, such as fingers' pressure monitoring sensors, gesture control sensors, etc. In an example embodiment, finger sensors 130 are wearable sensors such as sensors mounted on a glove.

Processing system 120 analyzes the key activation signal and the sensor activation signal received from a key on keyboard 110 and a finger sensor of finger sensors 130 respectively, and determines the character inputted by the user accordingly. Processing system 120 may use codes recognized by standard organizations such as ASCII, ISCII and Unicode for determining the character inputted by the user. Processing system 120 may also record the details such as the starting and ending time instances of the key activation signal and the sensor activation signals, the duration of the signals etc. Processing system 120 may use techniques known in the relevant arts for synchronizing the key activation signal and the sensor activation signal received for a keystroke. In one example embodiment, the synchronization is based on the time instances at which the key activation signal and the sensor activation signal are received.

Though keyboard 110 and processing system 120 are shown as separate entities in FIG. 1, keyboard 110 can also be a part of processing system 120.

Aspects of the present disclosure provide for reduced keystrokes while inputting characters of an Indic language. The description is continued with respect to reducing the keystrokes required for inputting characters of an Indic Language.

3. Reducing Keystrokes Required for Inputting Characters of an Indic Language

Figure 2:
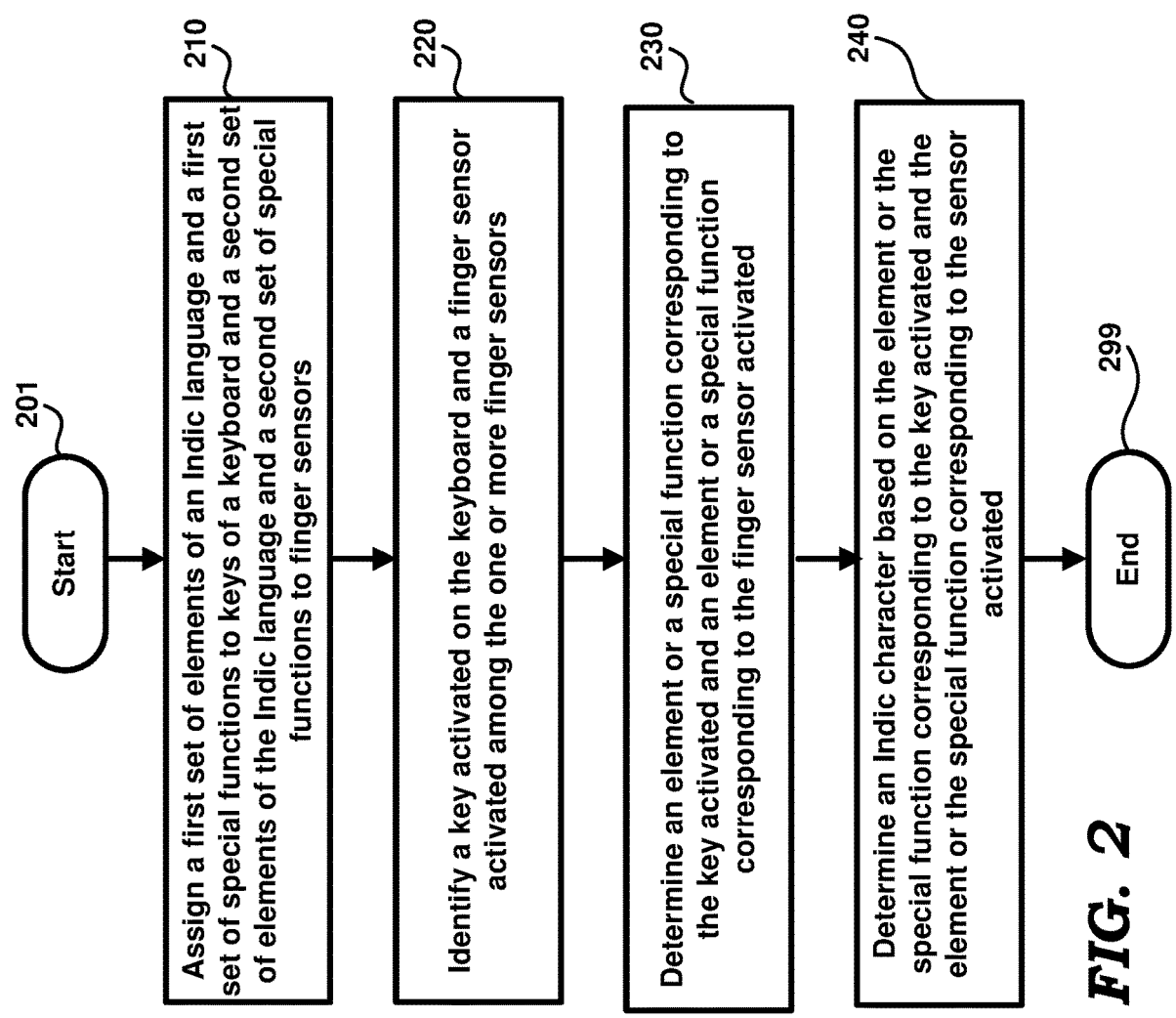
FIG. 2 is a flow chart illustrating the manner in which keystrokes required for inputting Indic characters are reduced according to an aspect of the present disclosure.

FIG. 2 is a flow chart illustrating the manner in which keystrokes required for inputting characters of an Indic language are reduced according to an aspect of the present disclosure. The features of FIG. 2 are described with respect to FIG. 1, and the steps of the flow chart of FIG. 2 are described as being performed at processing system 120 also merely for illustration, even though the steps can be performed in other environments and systems as will be apparent to a skilled practitioner. The flow chart begins in step 201, in which control immediately passes to step 210.

In step 210, processing system 120 assigns a first set of elements of an Indic language and a first set of special functions to one or more keys of keyboard 110, and a second set of elements of the Indic language and a second set of special functions to one or more sensors of finger sensors 130. Processing system 120 may assign the first and the second set of elements and the first and the second set of special functions in accordance with the inputs received from the user. In an example embodiment, the first set of elements includes consonants of the Indic language, the second set of elements includes dependent vowels and symbols of the Indic language, the first set of special functions includes 'shift' function, 'space' function, 'vowels execution' function among others, and the second set of special functions include 'conjunct consonants execution' function and 'Null' function among others. The special functions are explained below in detail.

In step 220, processing system 120 identifies that a key on the keyboard 110 is activated and a finger sensor among the one or more finger sensors 130 is activated. Processing system 120 identifies the activated key and the activated finger sensor based on corresponding key activation signal and sensor activation signal respectively.

In step 230, processing system 120 determines an element or a special function corresponding to the key activated and an element or a special function corresponding to the finger sensor activated. In an example embodiment, determining the element or the special function includes processing system 120 determining the standard codes (such as codes recognized by organizations such as ASCII or ISCII or Unicode) corresponding to the element or the special function.

In step 240, processing system 120 determines an Indic character inputted based on the element or the special function corresponding to the key activated and the element or the special function corresponding to the sensor activated. In an example embodiment, processing system 120 determines the Indic character based on the standard codes corresponding to the element(s) or special function(s) identified for each of the key and the sensor activated. The flow chart ends in in step 299.

The description is continued below with respect to an example implementation for reducing keystrokes required for typing characters of an Indic Language.

4. Example Implementation for Reducing Keystrokes Required for Inputting Characters of an Indic Language 4.1. Assigning Elements and Special Functions to the Keys on Keyboard and to the Sensors Associated with Fingers In an example embodiment, consonants (the first set of elements of the Indic language) are assigned to a first set of keys of keyboard 110. Each key in the first set of keys is assigned with at least one consonant. Some keys may be assigned with more than one consonant. Keyboard 110 also contains a second set of keys called as special keys meant for special purposes. The functions of the first set of special functions are assigned to the special keys (the second set of keys). The first set of special functions includes 'shift' function, 'space' function and 'vowels execution' function among others. The key assigned with 'shift' function may be called a 'shift' key, the key assigned with 'space' function may be called a 'space' key and a key assigned with 'vowels execution' function may be called a 'vowels execution' key. The shift key is used for switching between two elements and/or functions. For example, where a key on keyboard 110 is assigned with two consonants, the key represents one consonant when the key is pressed without pressing the shift key and represents another consonant when the same key is pressed along with (or after) the shift key. The vowels execution key is used for inputting vowels. Space key is used for inserting space between two characters or words. In an example embodiment, the "caps lock" key of standard QWERTY keyboard and the associated standard code are used for vowel execution with suitable modifications as the vowels execution key as the feature of capital letters is not found in Indic languages. However, other keys may also be used for vowels execution with suitable modifications.

Dependent vowels and symbols (the second set of elements of the Indic language) are assigned to the first set of finger sensors 130. Each sensor in the first set of finger sensors 130 is assigned with at least one dependent vowel or a symbol. Some sensors may be assigned with more than one dependent vowel or symbol. Finger sensors 130 also contain a second set of sensors called as special sensors for special purposes. The function of the second set of special functions are assigned to the special sensors (the second set of sensors). The second set of special functions includes a 'conjunct consonant execution' function. The sensor assigned with the 'conjunct consonant execution' function may be called a 'conjunct consonant execution' sensor. The 'conjunct consonant execution' is used for inputting conjunct consonants (conjunct consonant signs). Conjunct consonants are consonant signs that are not used independently and are always used in conjunction with a consonant.

The manner in which elements and special functions are assigned to the keys on keyboard 110 and to the sensors of finger sensors 130 is explained below with respect to an example embodiment. In the example embodiment below, the assignment of the elements and the special functions is explained with respect to the Indic language of 'Telugu'. However, the aspects of the present disclosure are applicable to other Indic languages as well.

Figure 3A:
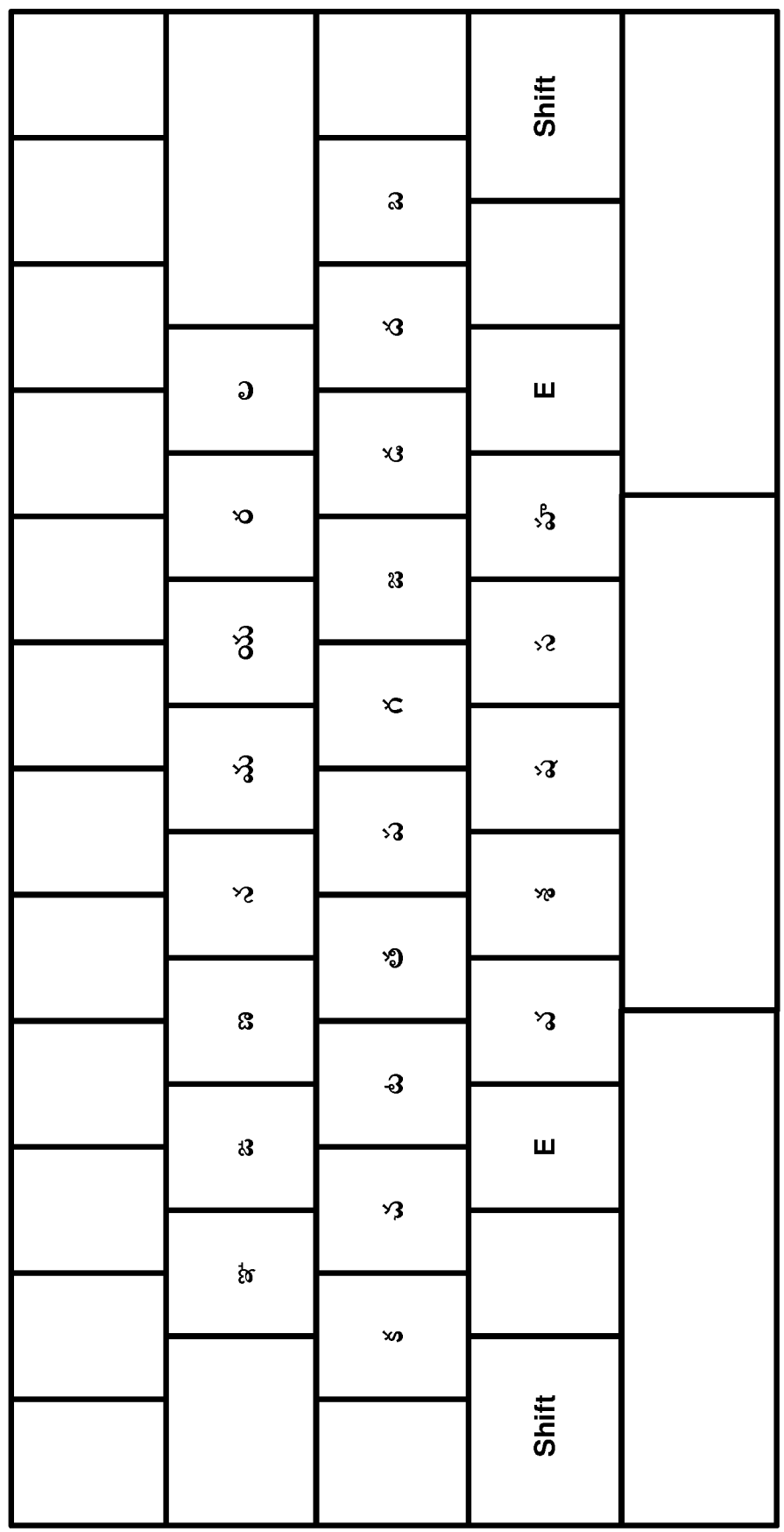
FIGS. 3A and 3B depict different layouts of keyboard 110 according to an example embodiment.
Figure 3B:
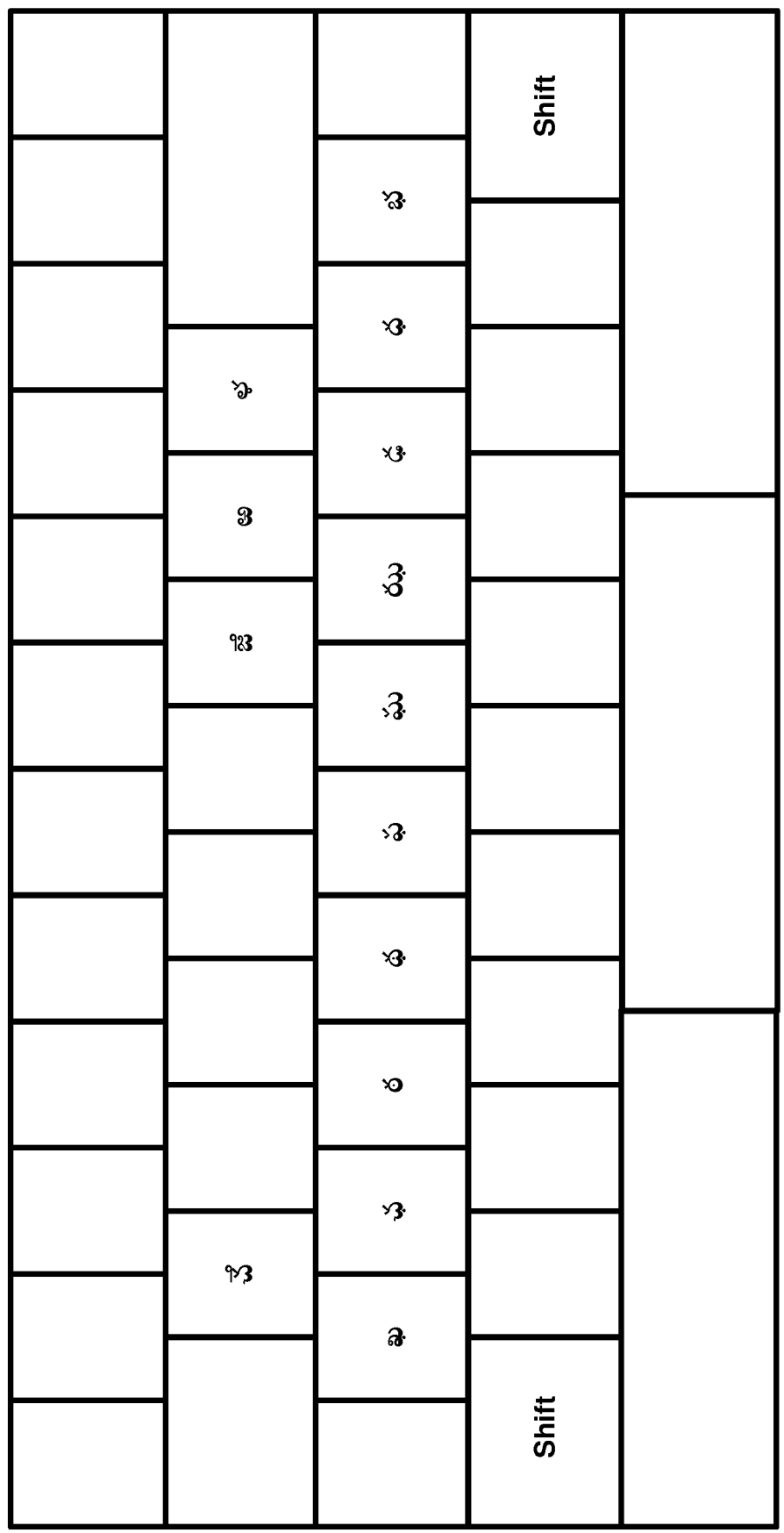
Figure 3C:
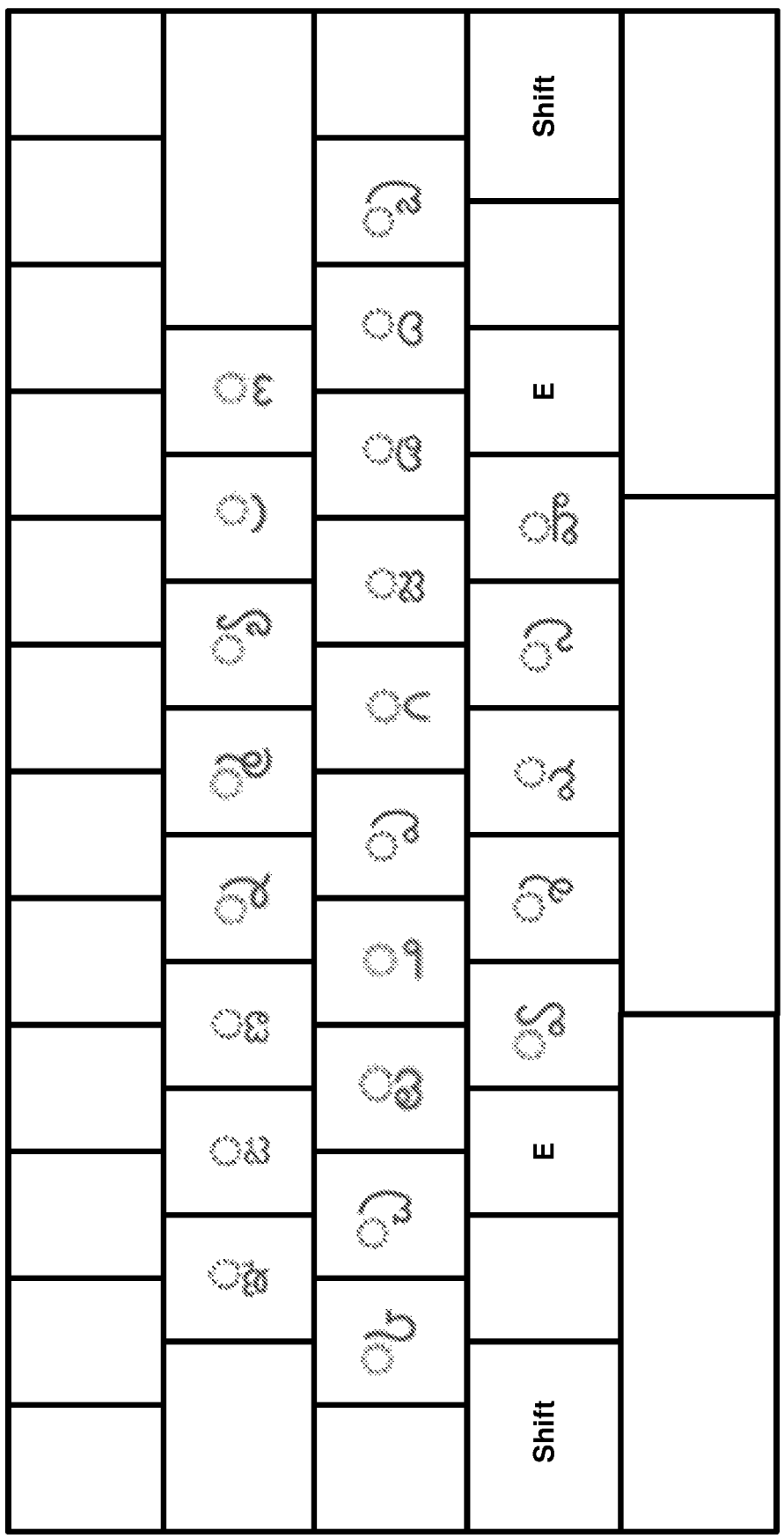
FIGS. 3C and 3D depict conjunct consonant signs corresponding to the consonants of the layouts of FIGS. 3A and 3B respectively.
Figure 3D:
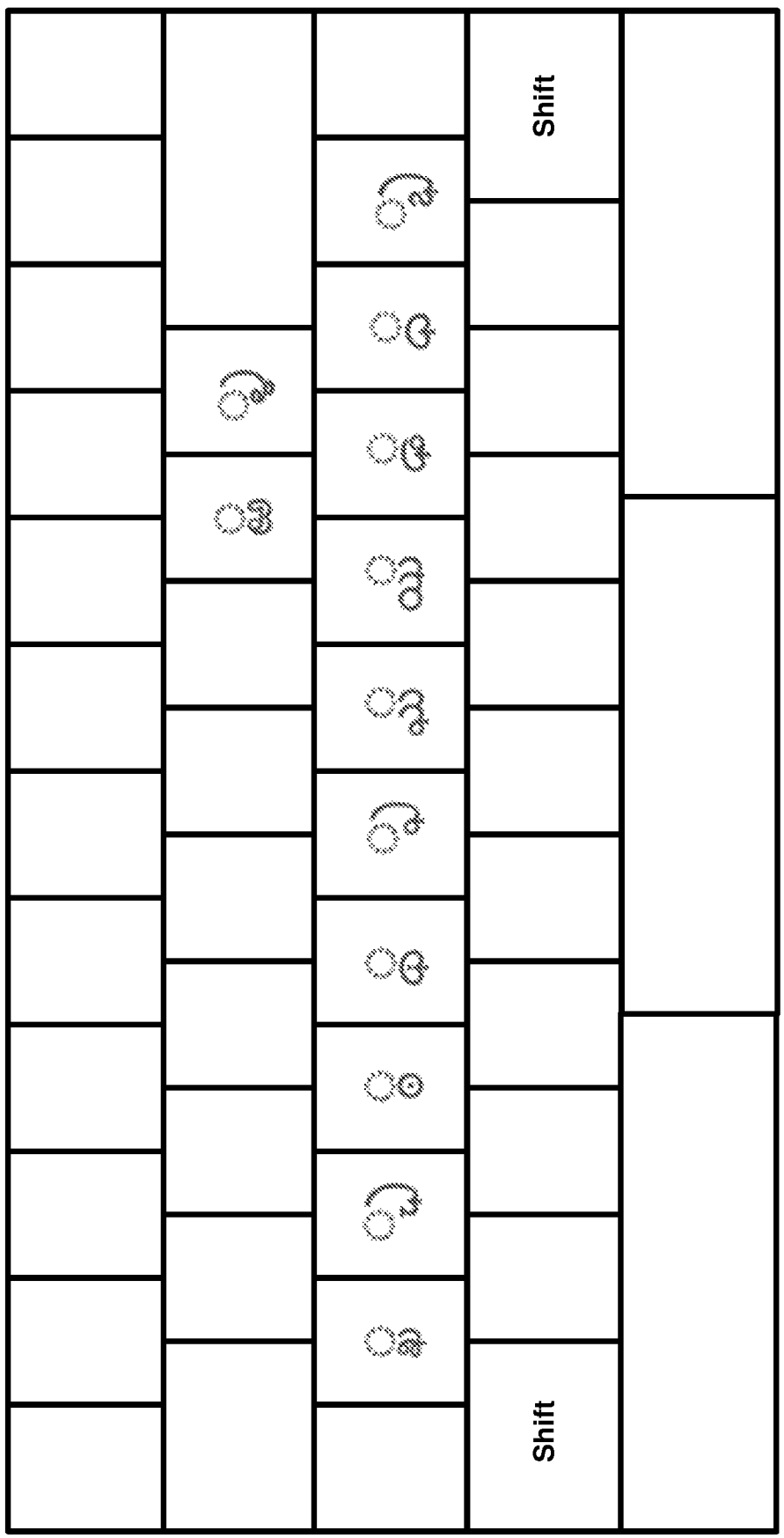

FIGS. 3A and 3B depict different layouts of keyboard 110 according to an example embodiment. As explained above, some keys on keyboard 110 are assigned with consonants. Also, some keys are assigned with more than one consonant. FIGS. 3C and 3D depict conjunct consonant signs corresponding to the consonants on the layouts of FIGS. 3A and 3B respectively.

FIG. 3A shows the assignment of a first set of Telugu consonants. These consonants can be entered without using the shift key on keyboard 110. FIG. 3A is also shown containing special keys, i.e., shift keys and vowels execution keys (denoted with 'E'). FIG. 3B shows the assignment of a second set of Telugu consonants that can be entered only using the shift key on keyboard 110. It may be readily observed from FIGS. 3A and 3B that the consonants are assigned to the keys on keyboard 110 in accordance with the grammatical rules and similarities/correlations between the consonants. Such layouts help the user in remembering the key assignments easily. However, the assignment of consonants to keys on keyboard 110 is not rigid and may also be done in a different manner.

FIGS. 3C and 3D depict conjunct consonant signs corresponding to the consonants on the layouts of FIGS. 3A and 3B respectively. It may be appreciated that there are no conjunct consonant signs corresponding to some consonants.

A conjunct consonant sign corresponding to a consonant can be inputted by providing a keystroke on the consonant key with the finger associated with the conjunct consonant execution sensor. For example, by pressing the key corresponding to consonant 'క' ('ka') with the finger associated with the conjunct consonant sensor, corresponding conjunct consonant sign shown in FIG. 3C can be inputted.

Though not shown in FIGS. 3A-3D, keyboard 110 may also contain punctuation marks, numbers and other symbols.

Table-1 below shows the manner in which dependent vowels and symbols in the Indic language of Telugu are assigned to finger sensors 130 associated with the right hand fingers and the left hand fingers of the user in an example embodiment.

TABLE 1

| | Dependent Vowels and Symbols in Telugu and Special function | |
|---|---|---|
| Finger Sensor | Finger sensor activation time period < threshold time period | Finger sensor activation time period => threshold time period |
| Left little finger | 'Null' function | ౭ |
| Left ring finger | ై | ీ |
| Left middle finger | ఌ | ౡ |
| Left index finger | ె | ే |
| Left thumb | 'conjunct consonant execution' function | |
| Right thumb | ౦ | ౩ |
| Right index finger | ొ | ో |
| Right middle finger | ు | ూ |
| Right ring finger | | ఽ |
| Right little finger | ౄ | ౦ |

It may be readily observed that, left ring finger, left middle finger, left index finger, right thumb, right index finger, right middle finger and right little finger sensors are assigned with two dependent vowels; left little finger sensor is assigned with 'Null' function and a dependent vowel; right ring finger sensor is assigned with a symbol; and left thumb sensor is assigned with a special function i.e., with 'conjunct consonant execution' function. It should be noted that the assignment noted in Table-1 is not rigid and can be changed based on user preferences.

Furthermore, Table-1 does not show some rarely used or now obsolete dependent vowels. In alternative embodiments, such dependent vowels may also be assigned as will be apparent to a skilled practitioner.

4.2 Determining the Elements and the Special Functions Corresponding to the Keys and the Sensors Activated The manner in which elements and special functions corresponding to the keys and the finger sensors activated are determined by processing system 120 is explained below.

When a key on keyboard 110 is activated with a finger, processing system 120 receives a corresponding key activation signal from the key and a corresponding sensor activation signal from the sensor associated with the finger. Processing system 120 identifies the activated key and the activated sensor based on the key activation signal and the sensor activation signal respectively. Processing system 120 then identifies the corresponding element(s) or special function(s) assigned to the key and the sensor.

If the key is assigned with only one element or one function, the element or function is determined as the element or function corresponding to the key activated. If the key is assigned with two elements (as shown in layouts of FIGS. 3A and 3B), processing system 120 examines whether a shift key is activated along with (or prior to) the activation of the key. If the shift key is not activated, processing system 120 determines the element of layout of FIG. 3A as the element corresponding to the key activated. If the shift key is activated, processing system 120 determines the element of layout of FIG. 3B as the corresponding element to the key activated. Multiple functions assigned to a key may also be determined in a similar manner.

For example, consonants 'ඞ' and 'ඣ' are both assigned to the same key on keyboard 110 as may be readily observed from FIGS. 3A and 3B. When the key is pressed without pressing a shift key, processing system 120 determines 'ඞ' as the corresponding element. However, when the key is pressed along with a shift key, processing system 120 determines "ඣ" as the corresponding element. The determination of the corresponding element also includes determining the standard code corresponding to the element.

If finger the sensor is assigned with only one element or function, the element or function is determined as the element corresponding to the sensor activated. In cases where a finger has more than one assignment, the corresponding element or the special function is identified based on the time period for which the finger sensor is activated.

For instance, dependent vowels 'ි' and 'ී' are both assigned to the same finger sensor as may be readily observed from Table-1. When the finger sensor is activated for a time period shorter than a threshold time period, processing system 120 identifies 'ි' as the corresponding dependent vowel. However, when the finger sensor is activated for a time period equal to or longer than the threshold time period, processing system 120 identifies 'ී' as the corresponding dependent vowel. Similarly, in the case of left little finger sensor, processing system 120 identifies 'Null' function if the sensor is activated for a time period shorter than the threshold time period and processing system 120 identifies 'ෳ' as the corresponding dependent vowel if the sensor is activated for a time period equal to or longer than the threshold time period.

'Null' function is useful in typing vowel 'අ' and consonants. The combination of vowels execution key and 'Null' function indicates that vowel 'අ' is typed. The combination of consonant key and 'Null' function indicates that the consonant corresponding to the consonant key is typed. For example, the combination of consonant key 'ස' an 'Null' function results in the consonant 'ස' itself. Though not shown in FIG. 1, system 100 of FIG. 1 may also include an LED indicator, that indicates whether a finger sensor is activated for a time period equal to or longer than the threshold time period. In an example embodiment, LED indicator will be 'ON' if a finger sensor is activated for a time period equal to or longer than the threshold time period. In alternative embodiment, other techniques as will be apparent to a skilled practitioner can be used for this purpose.

6. Determination of the Characters Inputted

Figure 4:
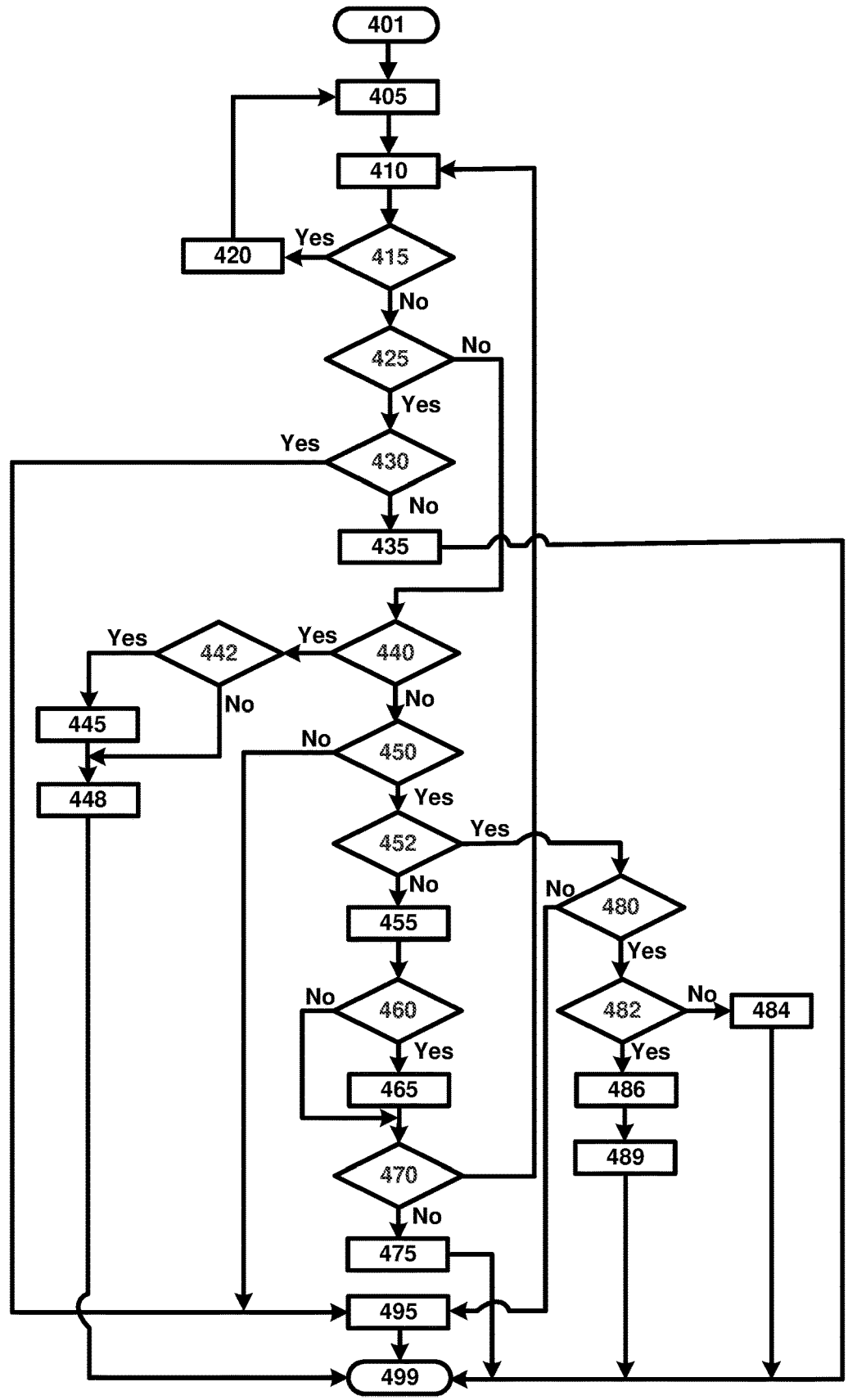
FIG. 4 is a flow chart illustrating the manner in which the characters inputted by the user are determined according to an aspect of the present disclosure.

FIG. 4 is a flow chart illustrating the manner in which the characters inputted by the user are determined according to an aspect of the present disclosure. The features of FIG. 4 are described with respect to FIG. 1, and the steps of the flow chart of FIG. 4 are described as being performed at processing system 120 also merely for illustration, even though the steps can be performed in other environments and systems as will be apparent to a skilled practitioner. The flow chart begins in step 401, in which control immediately passes to step 405.

In step 405, processing system 120 receives activation signals from a key of keyboard 110 and a finger sensor of finger sensors 130 simultaneously. Processing system 120 calculates the start time and the end time for the activation signals received from the key and the finger sensor.

In step 410, processing system calculates the duration of the activation signal received from the finger sensor (finger sensor activation signal duration) based on the start time and the end time of the activation signal received from the finger sensor. Also, processing system 120 determines the key and the finger sensor activated. Processing system 120 stores details such as finger sensor activation signal duration, and key and finger sensor activated as an entry in a temporary buffer.

In step 415, processing system 120 determines whether the activated key is a shift key. Control passes to step 420 if the key is a shift key and to step 425 if the key is not a shift key. In step 420, processing system 120 (irrespective of the finger sensor activated) activates the shift layout of keyboard 110 for a specific period to receive inputs from the user and the control passes to step 405.

In step 425, processing system 120 determines whether the key is a vowels execution key. Control passes to step 430 if the key is a vowels execution key and the control passes to step 440 if the key is not a vowels execution key. In step 430 (i.e., if the key is a vowels execution key), processing system 120 determines whether the finger sensor activated is a conjunct consonant execution sensor. If the finger sensor activated is conjunct consonant sensor, processing system 120 may indicate an error (through an LED light or a sound indication) and the control may pass to step 495. Control passes to step 435 if the finger sensor activated is not conjunct consonant sensor. In step 435, processing system 120 determines the vowel (element) inputted for the entry in the temporary buffer, based on the finger sensor activated and the duration for which the finger sensor is activated. Processing system 120 stores the vowel determined in a separate memory. Processing system outputs the vowel determined to the user and deletes the entry in the temporary buffer, and the control passes to step 499. For example, if the vowels execution key is pressed with left little finger for a time period shorter than the threshold time, then the dependent vowel corresponding to the finger is identified as 'Null' function and the corresponding vowel is determined as ' ఎ '. If the vowels execution key is pressed with left little finger for a time period equal to greater than the threshold time, then the dependent vowel corresponding to the finger is identified as ' ా ' and the corresponding vowel is determined as ' ఎా '. Though not shown, in FIG. 4, in step 435, processing system 120 may also check for prohibited combinations. For example, there is no vowel corresponding to the symbol ' ా '. Accordingly, the combination of vowels execution key and ' ా ' is a prohibited combination. Upon determining a prohibited combination, processing system 120 may indicate an error (through an LED light or a sound indication) and the control may passes to step 495.

In step 440, processing system 120 determines whether the key is a space or a punctuation key or a number key or a symbol key. If yes, control passes to step 442 and if no, control passes to step 450. In step 442, processing system 120 determines whether there is any previous entry in the temporary buffer. Control passes to step 445 if there is any previous entry in the temporary buffer and to step 448 if there is no previous entry. In step 445, processing system 120 stores the character determined for the previous entry in the separate memory and deletes the previous entry in the temporary buffer. In step 448, processing system 120 ignores the activation signal from the finger sensor, saves the space/punctuation/number/symbol in the separate memory and outputs the same, and deletes the entry in the temporary buffer and the control passes to step 499.

In step 450, processing system 120 determines whether the key is a consonant key. Control passes to step 452 if the key is a consonant key and the control passes to step 495 if the key is not a consonant key. In step 452, processing system 120 determines whether the finger sensor activated is a conjunct consonant sensor. Control passes to step 455 if the finger sensor is not a conjunct consonant sensor and the control passes to step 480 if the finger sensor activated is a conjunct consonant sensor. In step 455, processing system 120 determines the consonant corresponding to the key activated and the dependent vowel/function (Null function)/symbol assigned to the finger sensor activated. Processing system 120 determines the character inputted based on the consonant and the dependent vowel/function (Null function)/symbol. For example, if the consonant corresponding to the key activated is identified as ' స ' and the dependent vowel corresponding to the finger activated is identified as ' ా ', then processing system 120 determines the character inputted as ' సా '. In an example embodiment, determining the consonant and the dependent vowel includes identifying standard codes (such as Unicode). Processing system 120 updates the entry in the temporary buffer with the details of the consonant, dependent vowel/function (Null function)/symbol, and the character inputted. Thereafter processing system 120 outputs the determined character.

In step 460, processing system 120 determines whether there is any previous entry in the temporary buffer. Control passes to step 465 if there is any previous entry in the temporary buffer and to 470 if there is no previous entry in the temporary buffer. In step 465, processing system 120 stores the character determined for the previous entry in the separate memory and deletes the previous entry in the temporary buffer.

In step 470, processing system 120 determines whether any further activation signals are received from keyboard 110 and finger sensors 130 within a predetermined time from receiving the last activation signals. Control passes to step 410 if any further activation signals are received in a predetermined time else the control passes to step 475. In step 475, processing system 120 stores the character determined for the entry in the separate memory, deletes the entry in the temporary buffer and the control passes to step 499.

In step 480, processing system 120 determines whether there is any entry in the temporary buffer. If there is no entry, processing system 120 may indicate an error and the control passes to step 495. The control passes to step 482 if there is an entry in the memory. In step 482, processing system 120 determines whether the conjunct consonant sensor is activated within a predetermined time from the time of creation of previous entry in temporary buffer. Control passes to step 484 if the condition is not satisfied and the control passes to step 486 if the condition is satisfied. In step 484, processing system 120 stores the character determined for the previous entry in the separate memory, deletes both previous and current entries in the temporary buffer and the control passes to step 499.

In step 486, processing system 120 determines the conjunct consonant sign corresponding to the key activated. In an example embodiment, determining the conjunct consonant sign for a consonant includes combining symbol ' ్ ' ('virama' in telugu or 'balant' in hindi) with the consonant. For example, determining the conjunct consonant sign of consonant ' మ ' includes combining symbol ' ్ ' with consonant ' మ '. Also, processor 120 identifies codes corresponding to symbol ' ్ ' and consonant ' మ '. Furthermore, determining conjunct consonant sign includes identifying the standard code(s) (such as Unicode) corresponding to symbol ' ్ ' and the consonant.

In step 489, processing system 120 determines the character inputted based on the details (consonant and dependent vowel/function/symbol) stored in the previous entry and the conjunct consonant sign determined in 486. Processing system 120 places the codes corresponding to the conjunct consonant sign (i.e., codes corresponding to symbol ' ్ ' ad the consonant) in between the codes of the consonant and the dependent vowel stored in the previous entry.

Processing system 120 stores the character determined in the separate memory, outputs the character determined, deletes the entries (previous and current) in the buffer and the control passes to step 499.

In step 495, processor 120 deletes the entry in the temporary buffer. The flowchart ends at step 499.

In alternative embodiments, single memory can be used instead of two memories (temporary buffer and separate memory). A memory can be any memory known in the relevant arts.

7. Example Illustrations 7.1. Inputting Vowel ' ఎ '

To input character (vowel) ' ఎ ', the user is required to press the vowels execution key on keyboard 110 using left little finger for a time period shorter than the predetermined threshold period. Upon pressing the vowels execution key, the key sends a key activation signal to processing system 120 and the finger sensor associated with the left little finger gets activated and sends a sensor activation signal to processing system 120. Processing system 120 identifies the corresponding dependent vowel as 'Null' function and determines the vowel typed as 'అ'.

7.2. Inputting Vowel 'ఆ'

To input character (vowel) 'ఆ', the user is required to press the vowels execution key on keyboard 110 using left little finger for a time period equal to or greater than the predetermined threshold period. Upon pressing the vowels execution key, keyboard 110 sends a key activation signal to processing system 120 and the finger sensor associated with the left little finger gets activated and sends a sensor activation signal to processing system 120. Processing system 120 identifies the corresponding dependent vowel as 'ా' and determines the vowel typed as 'ఆ'. Processing system 120 also determines other vowels inputted in a similar manner.

7.3. Execution of Character 'కి'

To input the character 'కి', the user is required to press the consonant key 'క' on keyboard 110 using left ring finger for a time period shorter than the predetermined threshold period. Upon pressing the key, keyboard 110 sends a key activation signal to processing system 120 and the finger sensor associated with the left ring finger gets activated and sends a sensor activation signal to processing system 120. Processing system 120 identifies the consonant corresponding to the key activated as 'క' and the dependent vowel corresponding to the finger sensor activated as 'ి'. Processing system also identifies the standard codes (per Unicode organization) corresponding to consonant 'క' and dependent vowel 'ి' as 0C15 and 0C3F respectively. Processing system 120 then determines the character typed by using the codes of 'క' and dependent vowel 'ి'. In an example embodiment, processing system 120 appends the code corresponding to dependent vowel 'ి' after the code corresponding to consonant 'క' and determines the character typed as 'కి' from the resultant code (i.e., code 0C3F is appended after the code 0C15 resulting in a code "0C150C3F", which is the code for character 'కి' (per Unicode standards).

7.4. Execution of Character 'క్క'

To input the character 'క్క', the user is required to first press the consonant key 'క' on keyboard 110 using left little finger for a time period shorter than the predetermined threshold period. Upon pressing the key, keyboard 110 sends a key activation signal to processing system 120 and the finger sensor associated with the left little finger gets activated and sends a sensor activation signal to processing system 120. Processing system 120 identifies the consonant corresponding to the key activated as 'క' and the dependent vowel corresponding to the finger sensor activated as 'Null' function. 'Null' function does not have any Unicode as such.

Processing system 120 outputs consonant 'క' as the character typed at this point.

Then to enter the conjunct consonant sign of consonant 'క', the user is required to press the consonant key 'క' on keyboard 110 using left thumb (i.e., the finger associated with the conjunct consonant execution sensor). Then processing system 120 identifies the codes (Unicode) corresponding to symbol '్' and consonant 'క'.

Thereafter processing system 120 places the code corresponding to the conjunct consonant sign in between the codes of the consonant and the dependent vowel entered in the first step i.e., processing system 120 places the code corresponding to the combination of '్' and 'క' in between the codes of consonant 'క' and 'Null' function (no code corresponding to the Null function). The resultant unicode for the combination of 'క'+'్'+'క' will be "0C150C4D0C15". Processing system 120 will then determine the character inputted as 'క్క'.

7.5. Execution of Character 'ముం'

To input the character 'ముం', the user is required to first press the consonant key 'ము' on keyboard 110 using left index finger for a time period shorter than the predetermined threshold period. Upon pressing the key, keyboard 110 sends a key activation signal to processing system 120 and the finger sensor associated with the left index finger gets activated and sends a sensor activation signal to processing system 120. Processing system 120 identifies the consonant corresponding to the key activated as 'ము' an the dependent vowel corresponding to the finger sensor activated as 'ం' and stores the same in temporary buffer while showing the character entered as 'ము'.

Then to enter the conjunct consonant sign of consonant 'ము', the user is required to press the consonant key 'ము' on keyboard 110 using left thumb (i.e., the finger associated with the conjunct consonant execution sensor). Then processing system 120 identifies the codes (Unicode) corresponding to symbol '్' and consonant 'ము'.

Thereafter processing system 120 places the code(s) corresponding to the conjunct consonant sign in between the codes of the consonant and the dependent vowel entered in the first step (previous entry) i.e., processing system 120 places the code corresponding to the combination of '్' and 'ము' in between the codes of consonant 'ము' and dependent vowel 'ం'. The resultant unicode for the combination of 'ము'+'్'+'ము'+'ం' will be "0C2E0C4D0C2E0C46". Processing system 120 will then determine the character typed as 'ముం'.

Thus, present disclosure discloses a method and system for reducing keystrokes required for typing characters of Indic languages. The present disclosure also discloses a novel method of typing or inputting. Furthermore, present disclosure discloses a novel input/output system.

It should be noted that the aspects of the present disclosure may also be applicable to non-Indic languages (both text-based and non text-based scripts) too. The aspects of present disclosure may also be applicable to other environments (such as gaming keyboards etc.) as will be apparent to a person skilled in the art.

8. Digital Processing System

Figure 5:
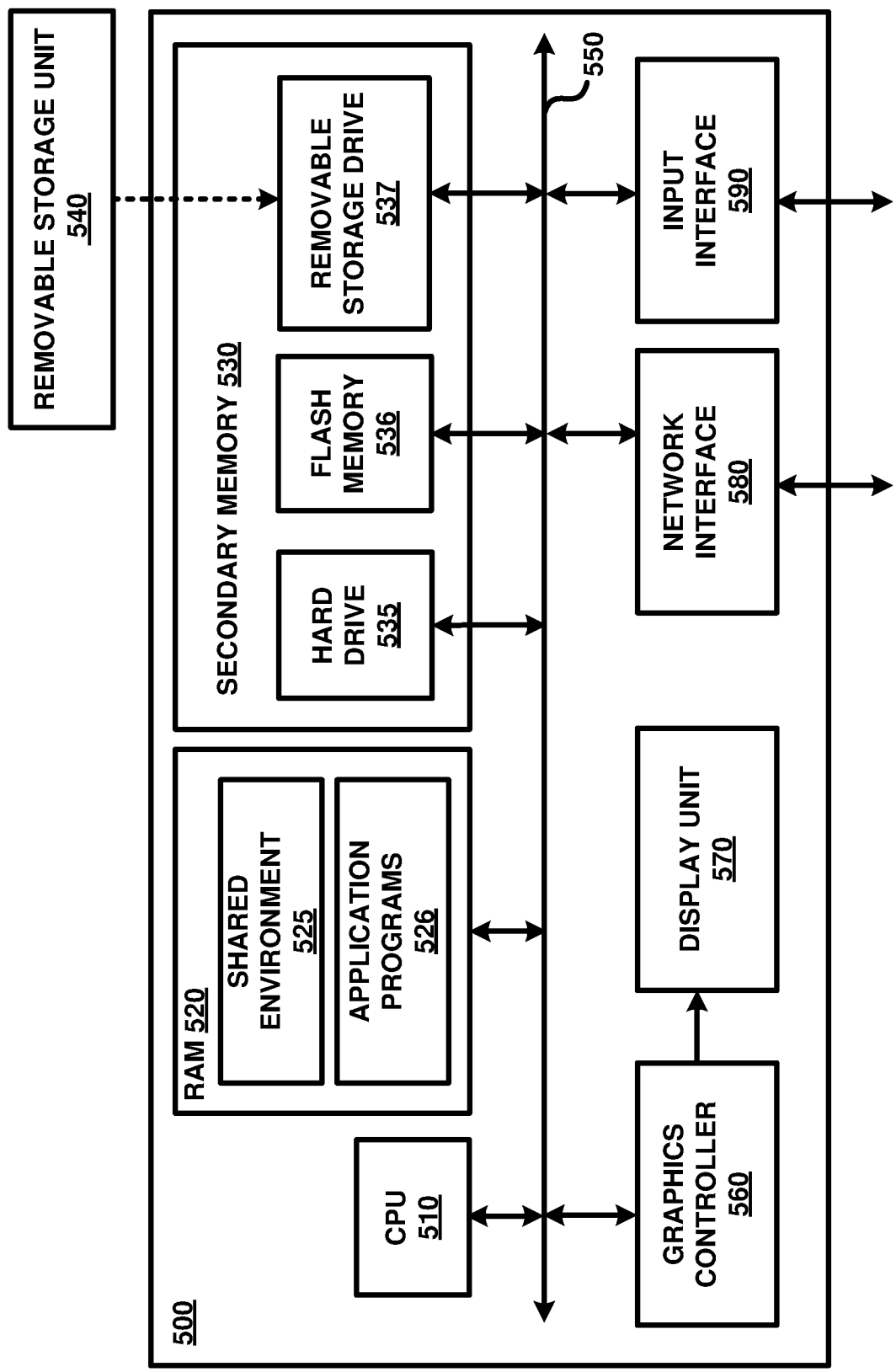
FIG. 5 is a block diagram illustrating the details of digital processing system in which various aspects of the present disclosure are operative by execution of appropriate executable modules.

FIG. 5 is a block diagram illustrating the details of digital processing system 500 in which various aspects of the present disclosure are operative by execution of appropriate executable modules. Digital processing system 500 corresponds to the system 100 of FIG. 1 (and to processing system 120).

Digital processing system 500 may contain one or more processors such as a central processing unit (CPU) 510, random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present disclosure. CPU 510 may contain multiple processing units, with each processing unit potentially being designed for a specific task. Alternatively, CPU 510 may contain only a single general-purpose processing unit.

RAM 520 may receive instructions from secondary memory 530 using communication path 550. RAM 520 is shown currently containing software instructions constituting shared environment 525 and application programs 526. Shared environment 525 includes operating systems, device drivers, virtual machines, etc., which provide a (common) run time environment for execution of user programs 526. The various modules described above may be contained in application programs 526 executing in shared environment 525.

Graphics controller 560 generates display signals (e.g., in RGB format) to display unit 570 based on data/instructions received from CPU 510. Display unit 570 contains a display screen to display the images defined by the display signals. Input interface 590 may correspond to a keyboard and a pointing device (e.g., touch-pad, mouse) that may be used to provide appropriate inputs (e.g., for editing the configuration data). Network interface 580 provides connectivity to a network (e.g., using Internet Protocol).

Secondary memory 530 may contain hard drive 535, flash memory 536, and removable storage drive 537. Secondary memory 530 may store the data (for example, portions of the configuration data as appropriate files) and software instructions (for implementing the flowchart of FIGS. 2 and 4), which enable digital processing system 500 to provide several features in accordance with the present disclosure. The code/instructions stored in secondary memory 530 either may be copied to RAM 520 prior to execution by CPU 510 for higher execution speeds, or may be directly executed by CPU 510.

Some or all of the data and instructions may be provided on removable storage unit 540, and the data and instructions may be read and provided by removable storage drive 537 to CPU 510. Removable storage unit 540 may be implemented using medium and storage format compatible with removable storage drive 537 such that removable storage drive 537 can read the data and instructions. Thus, removable storage unit 540 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 540 or hard disk installed in hard drive 535. These computer program products are means for providing software to digital processing system 500. CPU 510 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 530. Volatile media includes dynamic memory, such as RAM 520. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 550. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments.

While various embodiments of the present disclosure have been described above, it should be understood that they have been presented by way of example only, and not limitation. Thus, the breadth and scope of the present disclosure should not be limited by any of the above-described exemplary embodiments.

It should be understood that the figures illustrated in the attachments highlighting the functionality and advantages of the present disclosure are presented for example purposes only. The present disclosure is sufficiently flexible and configurable, such that it may be utilized in ways other than that shown in the accompanying figures.

What is claimed is:

1. A method of determining characters inputted, said method being performed at a processing system, said method comprising:

identifying a key activated among one or more keys of a keyboard and a sensor activated among one or more sensors associated with one or more fingers of a user;

determining an element or a special function corresponding to said key activated and an element or a special function corresponding to said sensor activated;

determining a character based on said element or said special function corresponding to said key activated and said element or said special function corresponding to said sensor activated, wherein said identifying of said key activated is based on a key activation signal received at said processing system, wherein said key gets activated upon receiving a keystroke from said user and sends said key activation signal to said processing system upon activation,
wherein said identifying of said sensor activated is based on a sensor activation signal received at said processing system, wherein said sensor gets activated when a keystroke is provided with a finger with which said sensor is associated and said sensor sends said sensor activation signal to said processing system upon activation; and
assigning a first set of elements of an Indic language and a first set of special functions to said one or more keys of said keyboard, and a second set of elements of said Indic language and a second set of special functions to said one or more sensors.

2. The method of claim 1, wherein said first set of elements includes one or more consonants of said Indic language,
wherein said second set of elements includes one or more dependent vowels or one or more symbols of said Indic language.

3. The method of claim 2, wherein said first set of special functions includes a shift function that facilitates switching between two consonants, a vowels execution function that facilitates inputting of vowels, and a space function that facilitates insertion of space,
wherein said second set of special functions includes a conjunct consonant execution function that facilitates inputting conjunct consonant signs and a null function.

4. The method of claim 3, wherein said identifying further includes:
recording corresponding starting time instances and ending time instances of said key activation signal and said sensor activation signal; and
recording the duration of said sensor activation signal, the duration being the time difference between the ending time instance and the starting time instance of said sensor activation signal.

5. The method of claim 4, wherein said key has only one assignment, wherein assignment indicates the total number of elements and special functions assigned to said key activated, said determining of said element or said special function corresponding to said key activated includes determining the element or the special function assigned to said key as said element or said special function corresponding to the key activated.

6. The method of claim 5, wherein said key activated has multiple assignments, said determining of said element or said function corresponding to said key activated is based on whether a key assigned with shift function is activated along with or prior to the activation of said key activated.

7. The method of claim 6, wherein said sensor has only one assignment, wherein assignment indicates the total number of elements and special functions assigned to said sensor activated, said determining of said element or said special function corresponding to said sensor activated includes determining the element or the special function assigned to said sensor as said element or said special function corresponding to said sensor activated.

8. The method of claim 6, wherein said key activated has two consonants assigned, a first consonant is determined as the consonant corresponding to said key activated if said key is activated without activating said key assigned with said shift function, and a second consonant is determined as the consonant corresponding to said key activated if said key is activated along with or after activating said key assigned with said shift function.

9. The method of claim 7, wherein said sensor activated has multiple assignments, said determining of said element or said function corresponding to said sensor activated is based on the duration of said sensor activation signal.

10. The method of claim 7, wherein said sensor activated has two dependent vowels assigned, a first dependent vowel is determined as said dependent vowel corresponding to said sensor activated if said duration of said sensor activation signal is less than a threshold time, and a second dependent vowel is determined as said dependent vowel corresponding to said sensor activated if the duration of corresponding sensor activation signal is equal to or greater than said threshold time.

11. The method of claim 9, wherein said determining of said character includes determining corresponding vowel or symbol of said Indic language, if said function corresponding to said key activated is said vowels execution function, and if said function corresponding to said sensor activated is not conjunct consonant function.

12. The method of claim 9, wherein said determining of said character includes determining said character as the consonant corresponding to said key activated, if said function corresponding to said sensor activated is a null function.

13. The method of claim 9, wherein said determining of said character includes determining said character as conjunct consonant of the consonant corresponding to said key, activated, if said function corresponding to said sensor activated is said conjunct consonant function.

14. The method of claim 9, wherein said key activated corresponds to a consonant and said sensor activated corresponds to a dependent vowel, said character is determined as corresponding gunintham (barakhadi) of said consonant.

15. The method of claim 9, further including providing an indication if said duration of said sensor activation signal is equal to greater than said threshold time.

16. The method of claim 9, wherein said determining of said element or said special function corresponding to said key activated and said sensor activated includes determining corresponding standard codes.

17. The method of claim 9, wherein said determining of said character is based on said standard codes determined for said key activated and said sensor activated.

18. A processing system for determining characters inputted, said processing system comprising:
a memory to store instructions;
one or more processors to execute the instructions stored in the memory to cause the digital processing system to perform the actions of:
identifying a key activated among one or more keys of a keyboard and a sensor activated among one or more sensors associated with one or more fingers of a user;
determining an element or a special function corresponding to said key activated and an element or a special function corresponding to said sensor activated;
determining a character based on said element or said special function corresponding to said key activated and said element or said special function corresponding to said sensor activated, wherein said identifying of said key activated is based on a key activation signal received at said processing system wherein said key gets activated upon receiving a keystroke from said user and sends said key activation signal to said processing system upon activation,
wherein said identifying of said sensor activated is based on a sensor activation signal received at said processing system, wherein said sensor gets activated when a keystroke is provided with a finger with which said sensor is associated and said sensor sends said sensor activation signal to said processing system upon activation, and assigning a first set of elements of an Indic language and a first set of special functions to said one or more keys of said keyboard, and a second set of elements of said Indic language and a second set of special functions to said one or more sensors.

19. The processing system of claim 18, wherein said first set of elements includes one or more consonants of said Indic language,
wherein said second set of elements includes one or more dependent vowels or one or more symbols of said Indic language.

20. The processing system of claim 19, wherein said first set of special functions includes a shift function that facilitates switching between two consonants, a vowels execution function that facilitates inputting of vowels, and a space function that facilitates insertion of space,
wherein said second set of special functions includes a conjunct consonant execution function that facilitates inputting conjunct consonant signs and a null function.

21. The processing system of claim 20, wherein said identifying further includes the actions of:
recording corresponding starting time instances and ending time instances of said key activation signal and said sensor activation signal; and
recording the duration of said sensor activation signal, the duration being the time difference between the ending time instance and the starting time instance of said sensor activation signal.

22. The processing system of claim 21, wherein said key has only one assignment, wherein assignment indicates the total number of elements and special functions assigned to said key activated, said determining of said element or said special function corresponding to said key activated includes determining the element or the special function assigned to said key as said element or said special function corresponding to the key activated.

23. The processing system of claim 22, wherein said key activated has multiple assignments, said determining of said element or said function corresponding to said key activated is based on whether a key assigned with shift function is activated along with or prior to the activation of said key activated.

24. The processing system of claim 23, wherein said sensor has only one assignment, wherein assignment indicates the total number of elements and special functions assigned to said sensor activated, said determining of said element or said special function corresponding to said sensor activated includes determining the element or the special function assigned to said sensor as said element or said special function corresponding to said sensor activated.

25. The processing system of claim 23, wherein said key activated has two consonants assigned, a first consonant is determined as the consonant corresponding to said key activated if said key is activated without activating said key assigned with said shift function, and a second consonant is determined as the consonant corresponding to said key activated if said key, is activated along with or after activating said key assigned with said shift function.

26. The processing system of claim 24, wherein said sensor activated has multiple assignments, said determining of said element or said function corresponding to said sensor activated is based on the duration of said sensor activation signal.

27. The processing system of claim 24, wherein said sensor activated has two dependent vowels assigned, a first dependent vowel is determined as said dependent vowel corresponding to said sensor activated if said duration of said sensor activation signal is less than a threshold time, and a second dependent vowel is determined as said dependent vowel corresponding to said sensor activated if the duration of corresponding sensor activation signal is equal to or greater than said threshold time.

28. The processing system of claim 26, wherein said determining of said character includes determining corresponding vowel or symbol of said Indic language, if said function corresponding to said key activated is said vowels execution function, and if said function corresponding to said sensor activated is not conjunct consonant function.

29. The processing system of claim 26, wherein said determining of said character includes determining said character as the consonant corresponding to said key activated, if said function corresponding to said sensor activated is a null function.

30. The processing system of claim 26, wherein said determining of said character includes determining said character as conjunct consonant of the consonant corresponding to said key activated, if said function corresponding to said sensor activated is said conjunct consonant function.

31. The processing system of 26, wherein said key activated corresponds to a consonant and said sensor activated corresponds to a dependent vowel, said character is determined as corresponding gunintham (barakhadi) of said consonant.

32. The processing system of claim 26, further including the action of providing an indication if said duration of said sensor activation signal is equal to greater than said threshold time.

33. The processing system of claim 26, wherein said determining of said element or said special function corresponding to said key activated and said sensor activated includes determining corresponding standard codes.

34. The processing system of claim 26, wherein said determining of said character is based on said standard codes determined for said key activated and said sensor activated.

35. A non-transitory machine readable medium storing one or more sequences of instructions, wherein execution of said one or more instructions by one or more processors contained in a digital processing system causes the digital processing system to perform the actions of:
identifying a key activated among one or more keys of a keyboard and a sensor activated among one or more sensors associated with one or more fingers of a user;
determining an element or a special function corresponding to said key activated and an element or a special function corresponding to said sensor activated;
determining a character based on said element or said special function corresponding to said key activated and said element or said special function corresponding to said sensor activated, wherein said identifying of said key activated is based on a key activation signal received at said processing system, wherein said key gets activated upon receiving a keystroke from said user and sends said key activation signal to said processing system upon activation,
wherein said identifying of said sensor activated is based on a sensor activation signal received at said processing system, wherein said sensor gets activated when a keystroke is provided with a finger with which said sensor is associated and said sensor sends said sensor activation signal to said processing system upon activation, and assigning a first set of elements of an Indic language and a first set of special functions to said one or more keys of said keyboard, and a second set of elements of said Indic language and a second set of special functions to said one or more sensors.

* * * * *